(12) United States Patent
Matsunaga et al.

(10) Patent No.: US 10,769,796 B2
(45) Date of Patent: Sep. 8, 2020

(54) INFORMATION PROCESSING APPARATUS, INFORMATION PROCESSING METHOD AND RECORDING MEDIUM

(71) Applicant: SONY CORPORATION, Tokyo (JP)

(72) Inventors: Hideyuki Matsunaga, Kanagawa (JP); Kosei Yamashita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 130 days.

(21) Appl. No.: 15/113,620

(22) PCT Filed: Jan. 13, 2015

(86) PCT No.: PCT/JP2015/050689
§ 371 (c)(1),
(2) Date: Jul. 22, 2016

(87) PCT Pub. No.: WO2015/141251
PCT Pub. Date: Sep. 24, 2015

(65) Prior Publication Data
US 2017/0011527 A1     Jan. 12, 2017

(30) Foreign Application Priority Data
Mar. 19, 2014    (JP) ................................. 2014-056794

(51) Int. Cl.
*G06T 7/20*      (2017.01)
*G06K 9/00*      (2006.01)
*G09B 19/00*     (2006.01)

(52) U.S. Cl.
CPC ............ *G06T 7/20* (2013.01); *G06K 9/00342* (2013.01); *G06K 9/00496* (2013.01);
(Continued)

(58) Field of Classification Search
CPC ....................................................... G06T 7/20
(Continued)

(56) References Cited

U.S. PATENT DOCUMENTS 6,850,252 B1 *   2/2005   Hoffberg ............ G06K 9/00369
                                                  348/E7.061
9,511,260 B2 *   12/2016   Molyneux ............ A43B 1/0054
(Continued)

FOREIGN PATENT DOCUMENTS

JP     2012-139493     7/2012
JP     2013-188426     9/2013
(Continued)

*Primary Examiner* — Christopher S Kelley
*Assistant Examiner* — Asmamaw G Tarko
(74) *Attorney, Agent, or Firm* — Paratus Law Group, PLLC

(57) ABSTRACT

There is provided an information processing apparatus to more accurately specify a type of event that is defined based on the sensor information and corresponds to the action of the user, the information processing apparatus including: a data acquiring section configured to acquire sensing data generated due to an action of a target; and an event specifying section configured to specify an event corresponding to the action based on a pattern shown in the sensing data and a context of the action. Provided is an information processing method, including: sensing an action of a target; transmitting sensing data acquired by the sensing; and performing, by a processor of an information processing apparatus that receives the sensing data, a process of specifying an event corresponding to the action based on a pattern shown in the sensing data and a context of the action.

14 Claims, 12 Drawing Sheets

(52) U.S. Cl.
CPC ............. *G09B 19/0038* (2013.01); *G06T 2207/10016* (2013.01); *G06T 2207/30221* (2013.01)

(58) Field of Classification Search
USPC ........................................ 348/157
See application file for complete search history.

(56) References Cited

U.S. PATENT DOCUMENTS

| | | | | |
|---|---|---|---|---|
| 9,519,750 | B2* | 12/2016 | Balakrishnan | A63B 71/0686 |
| 2002/0077189 | A1* | 6/2002 | Tuer | A63B 69/3632 |
| | | | | 473/151 |
| 2002/0115046 | A1* | 8/2002 | McNitt | A63B 24/0003 |
| | | | | 434/252 |
| 2005/0213817 | A1* | 9/2005 | Miyamori | G06K 9/00335 |
| | | | | 382/181 |
| 2007/0206837 | A1* | 9/2007 | Kirby | A63B 24/0003 |
| | | | | 382/107 |
| 2010/0173732 | A1* | 7/2010 | Vaniche | A63B 24/0003 |
| | | | | 473/422 |
| 2010/0184563 | A1* | 7/2010 | Molyneux | A43B 1/0054 |
| | | | | 482/1 |
| 2012/0057775 | A1* | 3/2012 | Suzuki | H04N 5/76 |
| | | | | 382/154 |
| 2014/0290332 | A1* | 10/2014 | Yamashita | A63B 69/36 |
| | | | | 73/11.01 |
| 2015/0016685 | A1* | 1/2015 | Matsunaga | G09B 19/0038 |
| | | | | 382/103 |
| 2015/0235143 | A1* | 8/2015 | Eder | G16H 50/50 |
| | | | | 706/12 |
| 2015/0282766 | A1* | 10/2015 | Cole | A61B 5/7267 |
| | | | | 702/139 |
| 2017/0032186 | A1* | 2/2017 | Murata | G06K 9/00671 |

FOREIGN PATENT DOCUMENTS

| | | |
|---|---|---|
| WO | WO2004/012150 A1 | 2/2004 |
| WO | WO2013/069447 A1 | 5/2013 |

* cited by examiner

| Pattern | Play Event |
|---|---|
| SWING-1 | FOREHAND STROKE |
| SWING-2 | FOREHAND SLICE |
| SWING-3 | FOREHAND VOLLEY |
| SWING-4 | BACKHAND STROKE (ONE-HAND) |
| SWING-5 | BACKHAND STROKE (BOTH-HANDS) |
| SWING-6 | BACKHAND SLICE |
| SWING-7 | BACKHAND VOLLEY |
| SWING-8 (OVERHAND) | SMASH |
| | SERVE |
| NS-1, NS-2, ... ,NS-7 | NOT SWING |

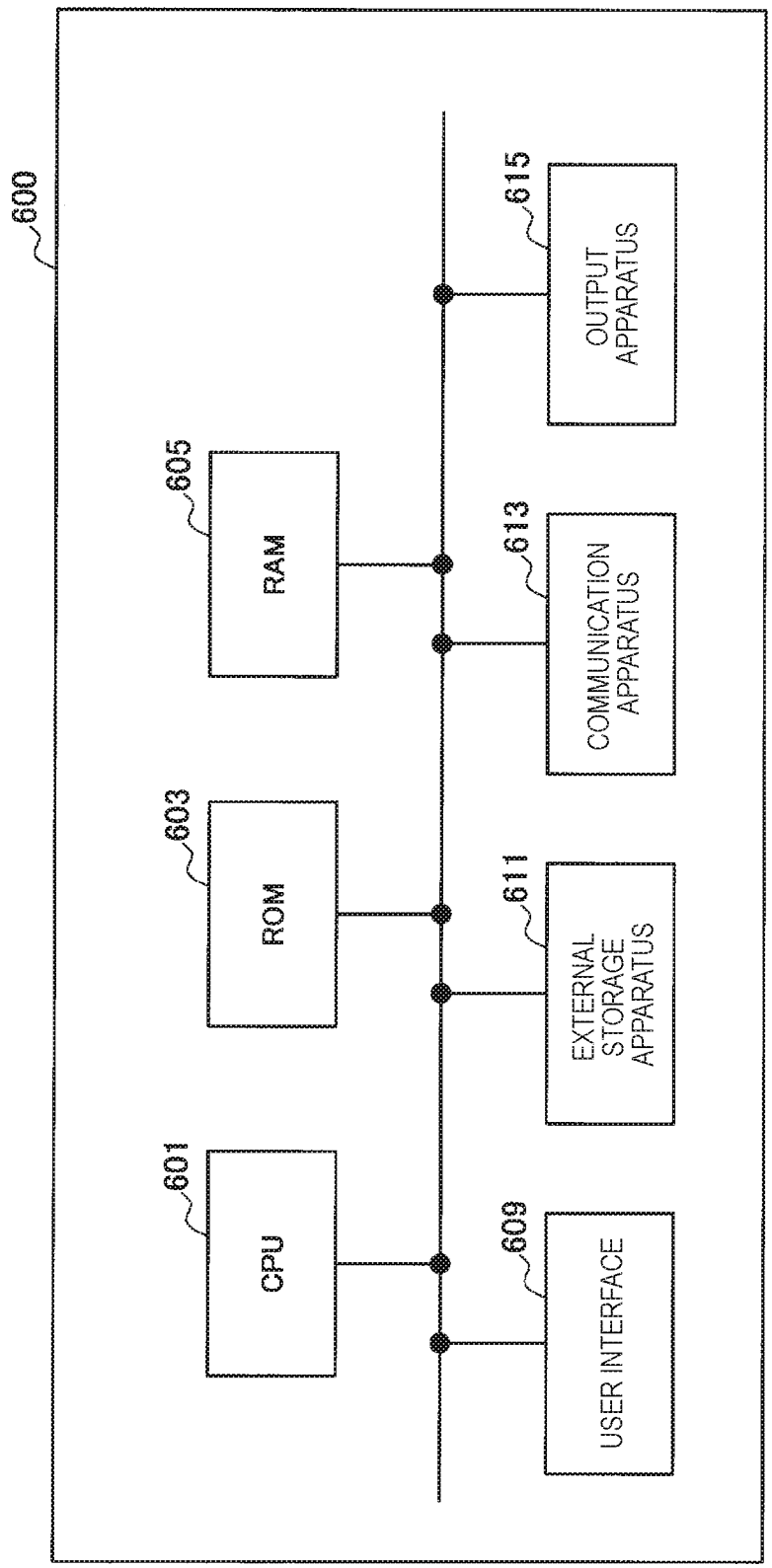

INFORMATION PROCESSING APPARATUS, INFORMATION PROCESSING METHOD AND RECORDING MEDIUM

CROSS REFERENCE TO PRIOR APPLICATION

This application is a National Stage Patent Application of PCT International Patent Application No. PCT/JP2015/050689 (filed on Jan. 13, 2015) under 35 U.S.C. § 371, which claims priority to Japanese Patent Application No. 2014-056794 (filed on Mar. 19, 2014), which are all hereby incorporated by reference in their entirety.

TECHNICAL FIELD

The present disclosure relates to an information processing apparatus, an information processing method, and a recording medium.

BACKGROUND ART

Techniques of assisting with a sports play using sensing or analysis have already been developed. For example, Patent Literature 1 discloses a technique of acquiring sensor information indicating behavior of a user who plays a sport, detecting the occurrence of a play event in a sport based on the sensor information, and generating play event information corresponding to the play event in order to detect a state of a sports play of the user more accurately. For example, it is possible to effectively assist the user with the sports play by generating notification information for the user based on the play event information, controlling imaging of a sports play image, or setting additional information in the play image.

CITATION LIST

Patent Literature

Patent Literature 1: JP 2013-188426A

SUMMARY OF INVENTION

Technical Problem

For example, when information corresponding to a play event in a sport is generated, and the information is used to assist with the play as in the technique disclosed in Patent Literature 1, it is important to specify a type of play event. For example, in the case in which the user plays tennis, when the occurrence of a play event is detected based on sensor information acquired from a sensor mounted on a racket or the like, specifying whether or not the event is a swing of the racket and whether it is a serve, a stroke, or a smash when the event is a swing is important in generating notification information useful for the user or appropriately controlling imaging of the play image.

For this point, Patent Literature 1 discloses specifying a detected type of play event through analysis of the sensor information using machine learning, pattern recognition, or the like. Many play events can be specified through this technique, hut, for example, when there are different types of play events that have little difference in the sensor information or the same type of play events that have a difference in the sensor information, it is difficult to accurately specify the play events only through the technique disclosed in Patent Literature 1. A similar phenomenon may occur even in general events that are defined based on the sensor information and correspond to action of the users as well as the play events in the sports.

In this regard, the present disclosure proposes an information processing apparatus, an information processing method, and a recording medium, which are novel and improved and capable of more accurately specifying a type of event that is defined based on the sensor information and corresponds to the action of the user.

Solution to Problem

According to the present disclosure, there is provided an information processing apparatus, including: a data acquiring section configured to acquire sensing data generated due to an action of a target; and an event specifying section configured to specify an event corresponding to the action based on a pattern shown in the sensing data and a context of the action.

According to the present disclosure, there is provided a recording medium having a program recorded thereon, the program causing a processor of an information processing apparatus to implement: a data acquisition function of acquiring sensing data generated due to an action of a target; and an event specifying function of specifying an event corresponding to the action based on a pattern shown in the sensing data and a context of the action.

According to the present disclosure, there is provided an information processing method, including: sensing an action of a target; transmitting sensing data acquired by the sensing; and performing, by a processor of an information processing apparatus that receives the sensing data, a process of specifying an event corresponding to the action based on a pattern shown in the sensing data and a context of the action.

Advantageous Effects of Invention

As described above, according to the present disclosure, it is possible to more accurately specify a type of event that is defined based on the sensor information and corresponds to the action of the user.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 13 is a diagram illustrating an example of a hardware configuration of an information processing apparatus according to an embodiment of the present disclosure.

DESCRIPTION OF EMBODIMENTS(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will proceed in the following order.
1. First embodiment
1-1. System configuration
1-2. Functional configuration for analysis process
1-3. Specific example of analysis process
1-4. Modified example
2. Second embodiment
3. Hardware configuration
4. Supplement

1. First Embodiment (1-1. System Configuration)

Figure 1:
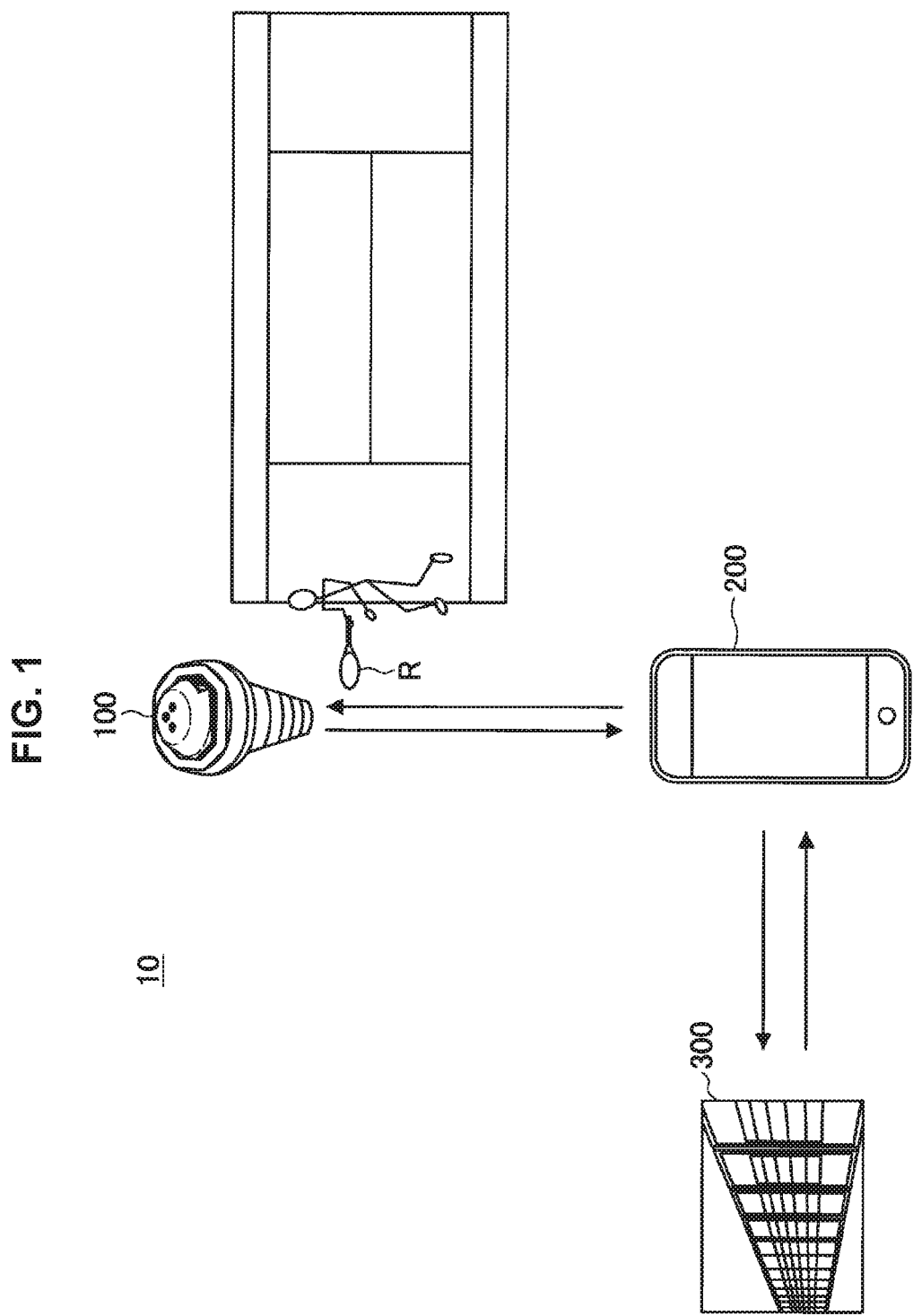
FIG. 1 is a diagram illustrating an example of a system configuration according to a first embodiment of the present disclosure.

FIG. 1 is a figure which shows an example of a system configuration according to a first embodiment of the present disclosure. With reference to FIG. 1, the system 10 includes a sensor apparatus 100, a smart phone 200, and a server 300.

The sensor apparatus 100 is mounted in a tennis racket R. The sensor apparatus 100 includes, for example, a motion sensor. The motion sensor may include, for example, a vibration sensor in addition to an acceleration sensor, a gyro sensor, and a geomagnetic sensor, or the like. The sensor apparatus 100 may further include a sensor that acquires environmental information of the user who plays a sport such as a temperature, moisture, brightness, or a position. The data detected by various kinds of sensors with which the sensor apparatus 100 is equipped is preprocessed as necessary and then transmitted to the smart phone 200 through wireless communication such as Bluetooth (a registered trademark).

In the illustrated example, the sensor apparatus 100 directly detects a motion of the racket R, but since the racket R is gripped by the user and moves according to the user's intention, it can be said that the sensor apparatus 100 detects the motion of the user indirectly through the motion of the racket R. In the present disclosure, in this case, it can be said that the sensor apparatus 100 is indirectly mounted on the user and detects the motion of the user.

In another embodiment, the sensor apparatus 100 may be mounted, for example, on clothing or a shoe of the user. In this case, the sensor apparatus 100 directly detects a motion of the clothing or the shoe, but since the clothing or the shoe moves with the user, it can be said that the sensor apparatus indirectly detects the motion of the user. Alternatively, the sensor apparatus 100 may be directly mounted on the user and, for example, may be put around an arm in a band form. In this case, the sensor apparatus 100 directly detects the motion of the user. In addition to when the sensor apparatus 100 directly detects the motion of the user, even when the sensor apparatus 100 indirectly detects the motion of the user, it is possible to define a play event corresponding to the motion of the user who plays a sport based on a detection result provided by the sensor apparatus 100 as long as the motion of the user is reflected in the detected motion.

For example, the smart phone 200 is arranged near the user who is playing a sport. In this case, the smart phone 200 receives the data transmitted from the sensor apparatus 100 through wireless communication such as Bluetooth (a registered trademark), temporarily accumulates or processes the received data as necessary, and transmits the resulting data to the server 300 through network communication. The smart phone 200 may receive a result of analysis performed by the server 300 based on the transmitted data and output the analysis result to the user through a display, a speaker, or the like. The analysis result may be output when the user is not playing a sport. The output of the analysis result may be performed by an information processing terminal used by the user such as a personal computer or a tablet terminal, a game machine, a television, or the like, separately from the smart phone 200.

The smart phone 200 may not necessarily be arranged near the user who is playing a sport. In this case, the sensor apparatus 100 accumulates the detected data in an internal storage region (a memory or an external storage device). For example, the data may be transmitted from the sensor apparatus 100 to the smart phone 200 through wireless communication such as Bluetooth (a registered trademark) when the sensor apparatus 100 and the smart phone 200 approach each other after the sports play. Alternatively, the data may be transmitted when the sensor apparatus 100 is connected with the smart phone 200 in a wired manner such as USB after the sports play. Further, a removable recording medium may be used for the data transfer from the sensor apparatus 100 to the smart phone 200.

The server 300 communicates with the smart phone 200 via network, and receives the data detected by various kinds of sensors with which the sensor apparatus 100 is equipped. The server 300 performs an analysis process using the received data, and generates various information related to a sports play. For example, the server 300 defines a play event based on data that directly or indirectly indicates the motion of the user who plays a sport and is acquired by the motion sensor. For example, the play event corresponds to a single shot using the racket R. By defining the play event, for example, it is possible to understand plays of the user indicated by motion data as a sequence of plays having a meaning such as serve, stroke, volley, . . . }.

Further, the server 300 may specify time-series segments into which a play event is classified, a play pattern of the user estimated from a time-series arrangement of a play event, or the like through a play event analysis process. For example, information generated by the analysis process of the server 300 is transmitted to the smart phone 200 and output toward the user through the display or the speaker of the smart phone 200. Alternatively, the server 300 may transmit the information to an information processing terminal other than the smart phone 200 and output the information toward the user. The server 300 may perform the analysis process based on data received for each of a plurality of users, generate information based on a result of comparing, for example, play patterns generated for each user, and transmit the generated information to the information processing terminal of each user.

Figure 2:
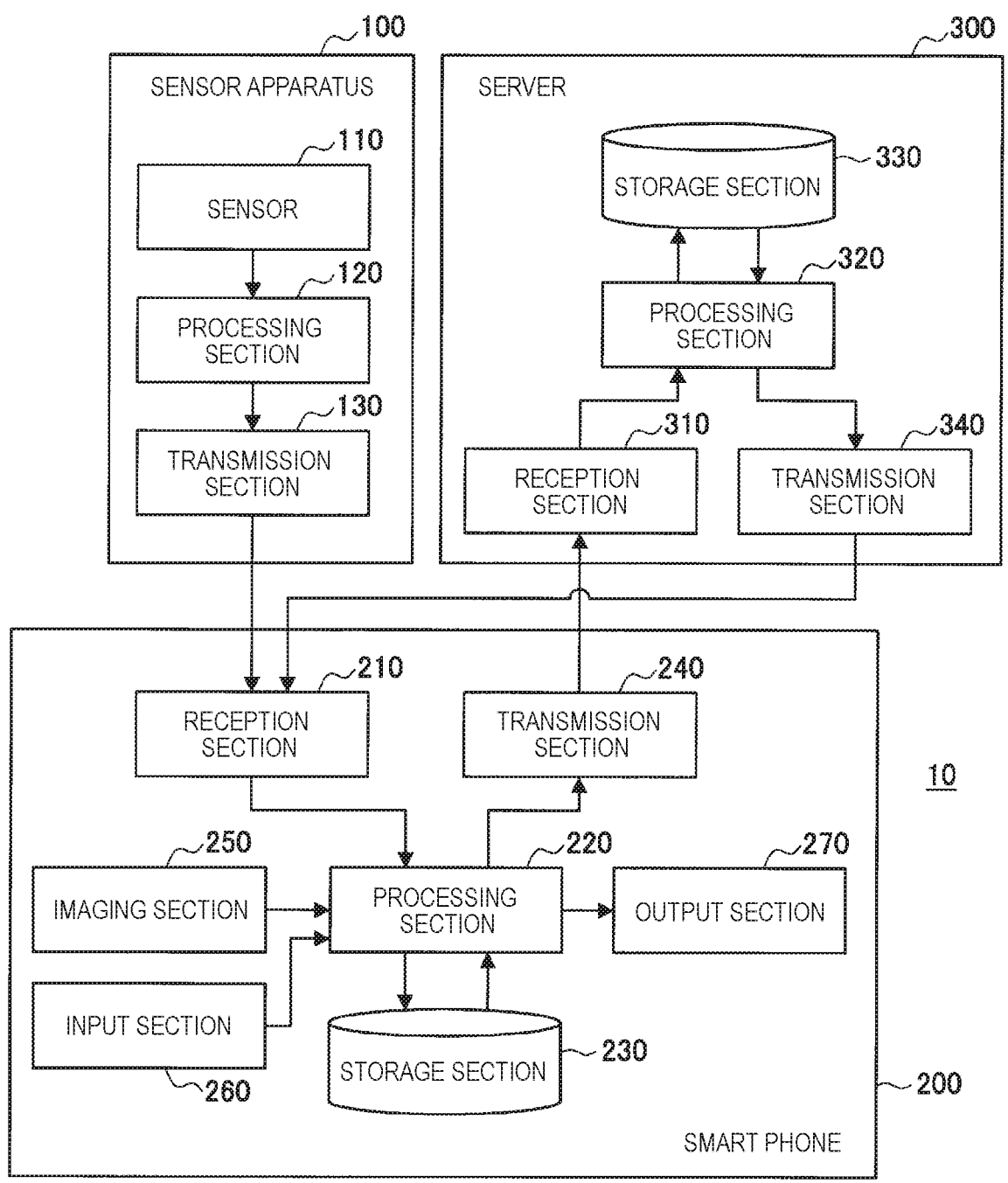
FIG. 2 is a block diagram schematically illustrating a device configuration of a system according to the first embodiment of the present disclosure.

FIG. 2 is a block diagram schematically illustrating a device configuration of a system according to the first embodiment of the present disclosure. Referring to FIG. 2, the sensor apparatus 100 includes a sensor 110, a processing section 120, and a transmission section 130, The smart phone 200 includes a reception section 210, a processing section 220, a storage section 230, a transmission section 240, an imaging section 250, an input section 260, and an output section 270. The server 300 includes a reception section 310, a processing section 320, a storage section 330, and a transmission section 340. Hardware configuration examples (hardware configuration examples of the sensor apparatus and the information processing apparatus) for implementing the respective devices will be described later.

In the sensor apparatus 100, the processing section 120 processes the data acquired by the sensor 110, and the transmission section 130 transmits the processed data to the smart phone 200. The sensor 110 includes, for example, the motion sensor that directly or indirectly detects the motion of the user who plays the sport as described above. The sensor 110 may further include other sensors for acquiring the environmental information of the user, such as a temperature, moisture, brightness, a position, or the like. The processing section 120 is implemented by a processor that operates according to a program, and performs preprocessing on the data acquired by the sensor 110 as necessary. The preprocessing may include, for example, sampling, noise reduction, or the like. The preprocessing may not necessarily be performed. The transmission section 130 is implemented by a communication device, and transmits the data to the smart phone 200, for example, using wireless communication such as Bluetooth (a registered trademark). Although not illustrated in FIG. 2, the sensor apparatus 100 may include a storage section that temporarily accumulates data or an output section that outputs information.

In the smart phone 200, the reception section 210 receives the data transmitted by the sensor apparatus 100, and the transmission section 240 transmits data to the server 300. The reception section 210 and the transmission section 240 are implemented by a communication device that performs, for example, wireless communication such as Bluetooth (a registered trademark) and wired or wireless network communication. The received data is temporarily stored in the storage section 230 and then transmitted, for example, through the processing section 220. The processing section 220 may perform preprocessing on the received data. The processing section 220 is implemented by a processor that operates according to a program, and the storage section 230 is implemented by a memory or a storage. The reception section 210 may further receive information transmitted from the server 300. For example, the received information may be output toward the user from the output section 270 according to control of the processing section 220. The output section 270 includes, for example, a display or a speaker.

Further, in the smart phone 200, the imaging section 250 acquires an image. For example, the imaging section 250 is implemented by a camera module in which an imaging element is combined with an optical system such as a lens. The image may include the user who plays a sport as a subject. For example, the image acquired by the imaging section 250 is transmitted from the transmission section 240 to the server 300 together with the data received through the reception section 210. For example, the server 300 may use the image for the analysis process together with the data acquired by the sensor apparatus 100 or may embed the image in information generated by the analysis process. The input section 260 includes, for example, a touch panel, a hardware button, a microphone that receives an audio input, and/or a camera that receives a gesture input. The processing section 220 may request the server 300 to transmit information through the transmission section 240 according to a user operation acquired through the input section 260.

The server 300 includes a reception section 310, a processing section 320, a storage section 330, and a transmission section 340. The reception section 310 is implemented by a communication apparatus, and receives data transmitted by using network communication such as the internet from the smart phone 200. The processing section 320 is implemented, for example, by a processor such as a CPU, and processes the received data. For example, the processing section 320 executes an analysis process of the process of the received data, and may additionally accumulate data after analysis in the storage section 330, or may output the data via the transmission section 340. Alternatively, the processing section 320 may only execute a control of the accumulation or output of the data already analyzed in the smart phone 200 or the like.

The configuration of the system according to the first embodiment of the present disclosure has been described above. The above-described configuration is an example, and various modifications can be made in other embodiments. For example, in the above example, the analysis process using the data acquired by the sensor apparatus 100 is performed by the processing section 320 of the server 300, but the analysis process may be performed by the processing section 220 of the smart phone 200 or the processing section 120 of the sensor apparatus 100. Alternatively, the analysis process may be distributedly performed by some or all of the processing sections 120, 220, and 320.

The system 10 has been described as including the sensor apparatus 100, the smart phone 200, and the server 300, but, for example, when the processing section 220 of the smart phone 200 performs the analysis process, the system 10 may not include the server 300. In other words, the process according to the present embodiment may be completed between the client terminals such as the sensor apparatus 100 and the smart phone 200. Alternatively, in this case, the server 300 may provide a function of storing an uploaded result of the analysis process performed by the smart phone 200 or causing the result to be shared between the users.

For example, when the processing section 120 of the sensor apparatus 100 performs the analysis process, the system 10 may not include the smart phone 200 and the server 300. In other words, the process according to the present embodiment may be completed in a single terminal apparatus such as the sensor apparatus 100. Alternatively, in this case, the smart phone 200 or the server 300 may provide a function of storing an uploaded result of the analysis process performed by the sensor apparatus 100 or causing the result to be shared between the users. The sensor apparatus 100 may be, for example, a dedicated sensor apparatus mounted on the user or a tool, or a sensor module mounted in a portable information processing terminal may function as the sensor apparatus 100. In this case, the sensor apparatus 100 may exchange data directly with the server 300.

(1-2. Functional Configuration for the Analysis Process)

Figure 3:
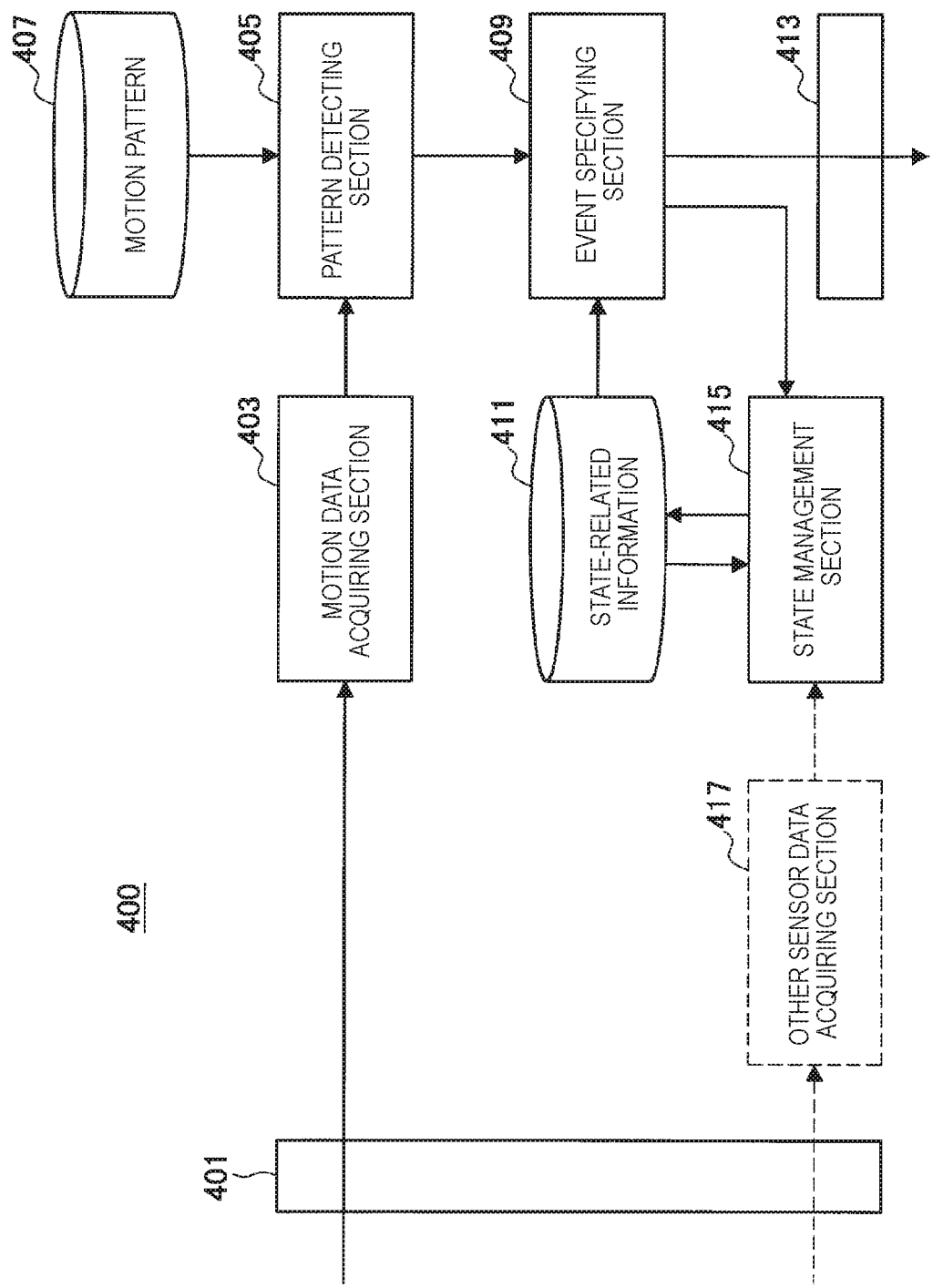
FIG. 3 is a block diagram illustrating a functional configuration for an analysis process according to a first embodiment of the present disclosure.

FIG. 3 is a block diagram illustrating a functional configuration for an analysis process according to the first embodiment of the present disclosure. Referring to FIG. 3, a functional configuration 400 includes an input interface 401, a motion data acquiring section 403, a pattern detecting section 405, an event specifying section 409, an output interface 413, a state management section 415, and an other sensor data acquiring section 417. In the functional configuration 400, the processing sections excluding the input interface 401 and the output interface 413, that is, the motion data acquiring section 403, the pattern detecting section 405, the event specifying section 409, the state management section 415, and the other sensor data acquiring section 417, are implemented by the processing section 120 of the sensor apparatus 100, the processing section 220 of the smart phone 200, and/or the processing section 320 of the server 300. Each functional component will be further described below The input interface 401 receives an input of various kinds of data used in the analysis process. For example, when the analysis process is performed by the processing section 120 of the sensor apparatus 100, the input interface 401 may be an internal interface that enables the processing section 120 to receive data such as a measurement value from the sensor 110. For example, when the analysis process is performed by the processing section 220 of the smart phone 200 or the processing section 320 of the server 300, the input interface 401 may be a communication interface for receiving data transmitted from the sensor apparatus 100 or the smart phone 200 serving as an external apparatus.

The motion data acquiring section 403 acquires the motion data provided by the motion sensor through the input interface 401. In the present embodiment, the sensor 110 of the sensor apparatus 100 includes the motion sensor. The motion sensor includes, for example, a three-axis acceleration sensor, a six-axis sensor (a three-axis acceleration sensor and a three-axis gyro sensor), or a nine-axis sensor (a three-axis acceleration sensor, a three-axis gyro sensor, and a three-axis geomagnetic sensor). The motion sensor may further include a vibration sensor. As described above, the motion data provided by the sensor is generated due to a sports play of the user. The motion data acquiring section 403 acquires a measurement value included in the motion data or data obtained by pre-processing the measurement value, and provides the measurement value or the data to the pattern detecting section 405.

The pattern detecting section 405 detects a pattern shown in the motion data acquired by the motion data acquiring section 403 with reference to the motion pattern 407. The motion pattern 407 is a pattern obtained by classifying features shown in the motion data, for example, using a technique such as machine learning or pattern recognition and stored in a storage section of an apparatus that performs the analysis process in advance. Alternatively, the motion pattern may be stored in a storage section of a different apparatus from an apparatus that performs the analysis process, and the pattern detecting section 405 may refer to the motion pattern 407 via a network. For example, the pattern detecting section 405 may net an analysis interval based on a waveform of the vibration sensor included in the motion data and detect the pattern shown in the motion data by comparing a waveform of acceleration, an angular velocity, or the like in the analysis interval with the waveform given as the motion pattern 407.

The event specifying section 409 specifies a play event corresponding to a play of the user based on the pattern of the motion data detected by the pattern detecting section 405. For example, in the case of tennis, when a swing of the racket occurs among a series of plays of the user, a characteristic pattern may occur in the motion data. The event specifying section 409 specifies a play event corresponding to the swing that has occurred based on the pattern detected by the pattern detecting section 405.

Here in the present embodiment, the play event is specified by a rule, theory, a custom, or the like of a sport. For example, in the case of tennis, there is a rule that when a rally starts from a serve, and when there is a serve mistake, a serve is possible up to two times. For example, shots of tennis during a rally are classified into points of views such as a forehand shot, a backhand shot, a stroke, a slice volley, and a smash. The event specifying section 409 specifies, for example, play events illustrated in FIG. 4 according to such a rule, theory, a custom, or the like.

Figures 4, 5:
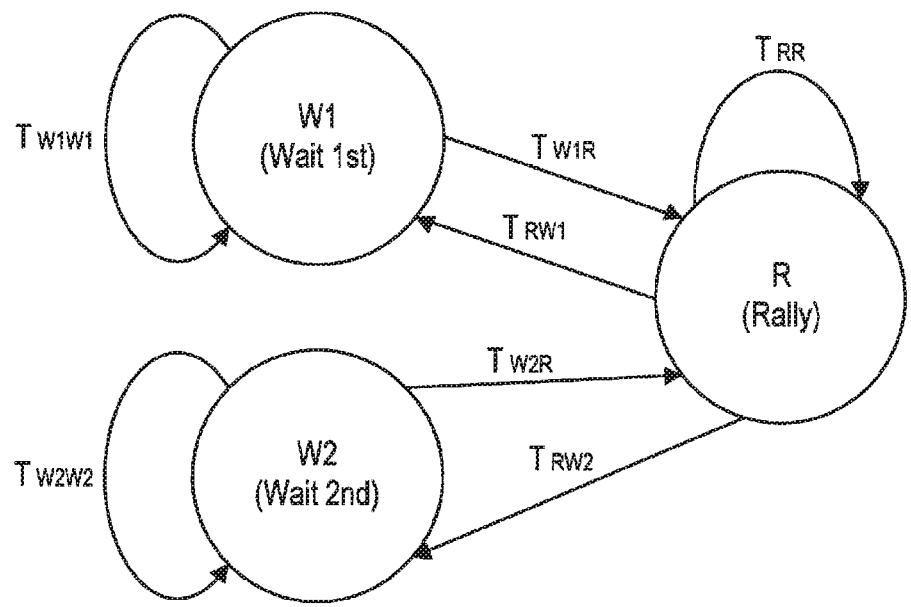
FIG. 4 is a diagram illustrating an example of a play event defined according to the present embodiment.
FIG. 5 is a diagram illustrating an example of a state related to a tennis play defined according to the present embodiment.

FIG. 4 is a diagram illustrating an example of play events defined in the present embodiment. In the illustrated example, play events corresponding to 8 patterns swing-1 to swing-8) detected when a swing occurs are illustrated. For example, the pattern "swing-1" is associated with the play event "forehand stroke." Similarly, the patterns "swing-2" to "swing-7" are each associated with a single play event. Since the play events are unique in the pattern shown in the motion data, it is possible to specify the play event based on the pattern.

Meanwhile, in the illustrated example, the pattern "swing-8" is a pattern of an overhand shot, but two play events of "smash" and "serve" are associated with the pattern. In other words, the play events of "smash" and "serve" are similar in the pattern shown in the motion data, and it is difficult to specify the play events using only the patterns. However, as described above, the play event of "serve" is an event that is explicitly distinguished from other shots in the rules of tennis, and thus specifying the play event of "serve" is important in providing useful information to the user.

In this regard, in the present embodiment, the event specifying section 409 selects an appropriate play event with further reference to state-related information 411 when specifying the play event based on the pattern of the motion data detected by the pattern detecting section 405. The state-related information 411 is information indicating a state of the sports play of the user. In the present embodiment, the state-related information 411 is stored in a storage section of an apparatus that performs the analysis process. Alternatively, the state-related information 411 may be stored in a different storage section from an apparatus that performs the analysis process, and the event specifying section 409 may refer to the state-related information 411 via a network. The state-related information 411 will be described later in detail together with a function of the state management section 415.

In the example illustrated in FIG. 4, patterns "NS-1" to "NS-7" are detected when an action of the user other than a swing occurs. The patterns are collectively associated with a play event "NOT SWING" In an example to be described below, the play event "NOT SWING" means nothing more than that an action of the user other than the swing has occurred, but in other examples, individual play events corresponding to the patterns "NS-1" to "NS-7" such as an action of stopping a ball with a racket when a ball is received, an action of hitting one's hand on a racket, an operation of dropping a racket, and the like may be specified.

Referring back to FIG. 3, the event specifying section 409 outputs information indicating the play event specified through the above process through the output interface 413. For example, the output information may be used for generation of a notification provided to the user in real time, may be updated for sharing, or may be used as an input of an additional analysis process. The event specifying section 409 may provide the information indicating the play event to the state management section 415. In this case, as will be described later, the state management section 415 updates the state-related information 415 according to the play event that has occurred.

The output interface 413 outputs the information indicating the play event specified by the event specifying section 409. For example, when the analysis process is performed by the processing section 120 of the sensor apparatus 100 or the processing section 220 of the smart phone 200, the output interface 413 may be an internal interface for outputting information related to the play event through a display, a speaker, or the like. For example, the output interface 413 may be a communication interface (for example, the transmission section 130, the transmission section 240, or the transmission section 340) for transmitting an analysis result to an external apparatus.

The state management section 415 manages the state-related information 411. In the present embodiment, the state-related information 411 is information indicating a state of the sports play of the user and is referred to when the event specifying section 409 specifies the play event. The state management section 415 updates the state-related information 415 based on information provided from the event specifying section 409. The state management section 415 may update the state-related information 415 based on information provided from the other sensor data acquiring section 417.

FIG. 5 is a diagram illustrating an example of a state related to a tennis play defined in the present embodiment. In the illustrated example, a standby state W1 for a 1st serve, a standby state W2 for a 2nd serve, and a rally state R are defined, for example, based on the motion data acquired by the motion data acquiring section 403. Transitions defined between states include transitions ($T_{W1R}$ and $T_{RW1}$) between the state W1 and the state R, transitions ($T_{W2R}$ and $T_{RW2}$) between the state W2 and the state R, and self transitions ($T_{W1W1}$, $T_{W2W2}$, and $T_{RR}$) of the respective states. For example, conditions based on information of the play event provided from the event specifying section 409 that specifies the play event based on the motion data, information provided from the other sensor data acquiring section 417, or the like are associated with the transitions. An example of the conditions is shown in the following Table 1.

TABLE 1 example of conditions associated with transitions

| Transitions | Conditions |
| --- | --- |
| $T_{W1W1}$ | NOT SWING event occurred |
| $T_{W1R}$ | shot event (other than NOT SWING) occurred |
| $T_{RR}$ | shot event (other than NOT SWING) occurred |
| $T_{RW1}$ | in transition other than $T_{RW2}$, NOT SWING event occurred/predetermined period of time elapsed in state in which no shot event occurs |
| $T_{RW2}$ | serve mistake was detected after $T_{W1R}$ occurred |
| $T_{W2W2}$ | NOT SWING event occurred |
| $T_{W2R}$ | shot event (other than NOT SWING) occurred |

In the example of Table 1, although the condition "serve mistake was detected" is associated with the transition $T_{RW2}$, the serve mistake is not necessarily detected depending on information provided from the event specifying section 409. The serve mistake may be detected based on information that is acquired by the other sensor data acquiring section 417 and indicates whether or not a ball goes outside a court, information that is manually input by the user, or the like.

As shown in the example of Table 1, the state management section 415 updates the state-related information 411 based on information that is provided by the event specifying section 409 or the other sensor data acquiring section 417 and indicates the occurrence of an event or a change in sensor data. Further, the state management section 415 may measure a period of time in which information indicating the occurrence of an event has not been provided from the event specifying section 409 using a timer or the like and update the state-related information 411 when a predetermined period of time has elapsed. Alternatively, the state management section 415 may perform the update process of the state-related information 411 at regular intervals and reflect the information provided from the event specifying section 409 or the other sensor data acquiring section 417 in the state-related information 411 when the update process is performed.

Referring back to FIG. 3, the other sensor data acquiring section 417 acquires a different type of sensing data from the motion sensor through the input interface 401. A sensor that provides such sensing data may be included in, for example, the sensor 110 of the sensor apparatus 100, may be included in the smart phone 200 (not illustrated in FIG. 2), or may be included in an apparatus different from the sensor apparatus 100 and the smart phone 200 such as a camera installed near a tennis court. For example, the sensor may include a sensor for acquiring information on an environment of the user such as a temperature sensor, a humidity sensor, an illuminance sensor, a position sensor (including a GPS receiver), or the like. The sensor may include an imaging apparatus that acquires an image of the user who plays a sport or the like or a biometric information sensor that measures a pulse of the user or the like.

As described above, the data acquired by the other sensor data acquiring section 417 may be used for updating of the state-related information 411 by the state management section 415. The other sensor data acquiring section 417 need not necessarily be installed when the state management section 415 updates the state-related information 411 mainly based on the information provided by the event specifying section 409. Alternatively, the event specifying section 409 may not provide information to the state management section 415 when the state management section 415 updates the state-related information 411 mainly based on the information provided by the other sensor data acquiring section 417.

(1-3. Specific Example of the Analysis Process)

Figure 6:
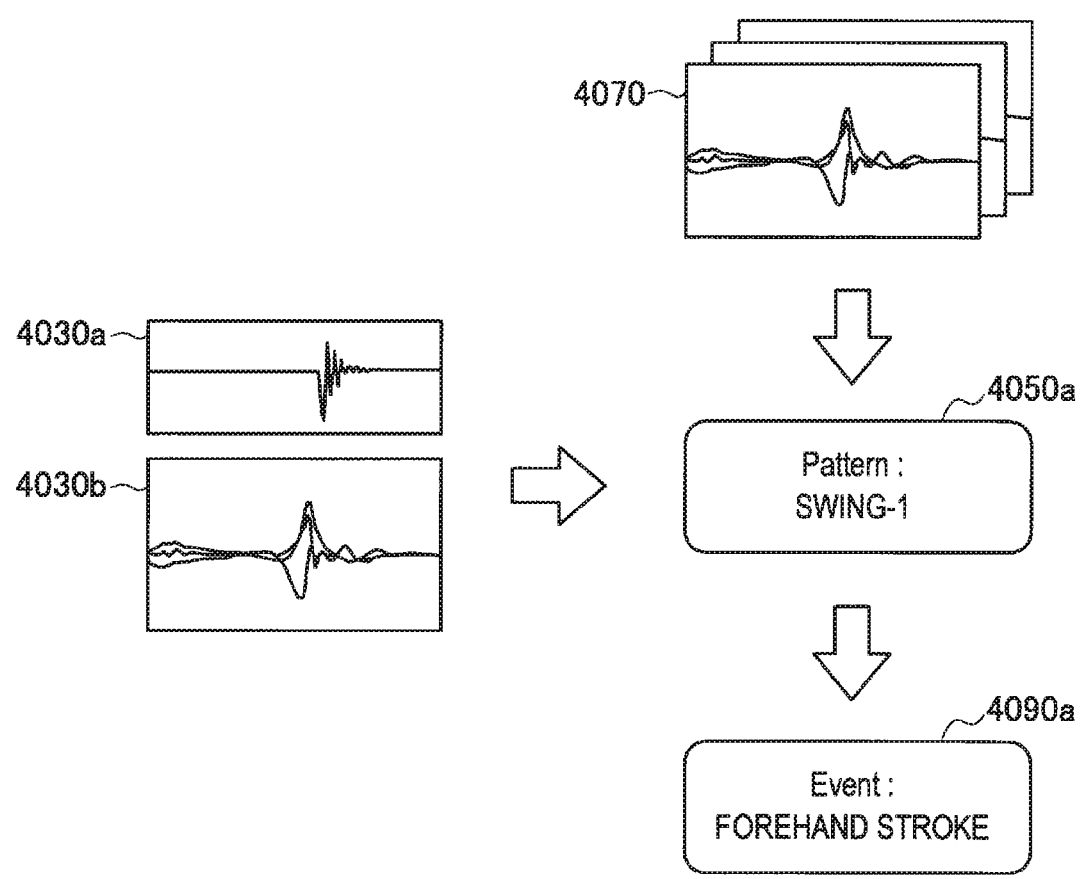
FIG. 6 is a diagram illustrating an example of a play event specified regardless of state-related information according to the first embodiment of the present disclosure.
Figure 7:
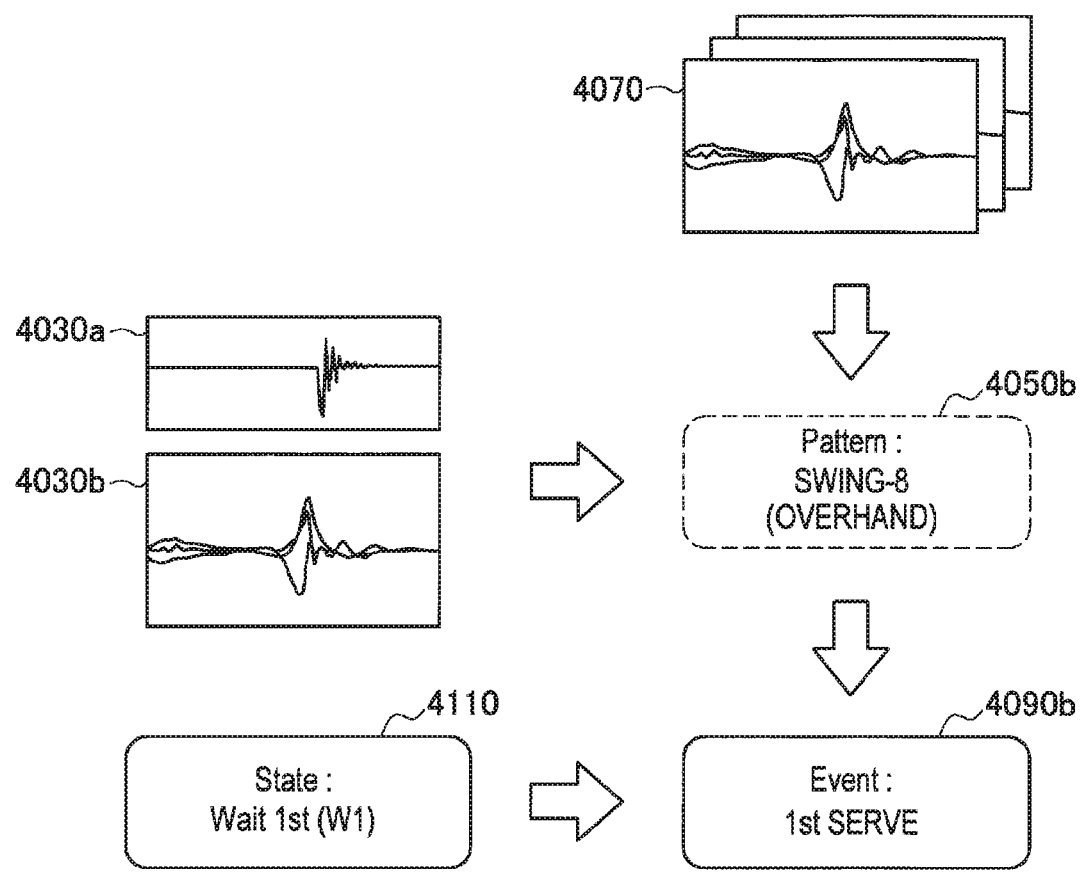
FIG. 7 is a diagram illustrating an example of a play event specified using state-related information according to the first embodiment of the present disclosure.

FIGS. 6 and 7 are diagrams illustrating an example of a play event specified regardless of the state-related information and an example of a play event specified using the state-related information according to the first embodiment of the present disclosure.

FIG. 6 illustrates an example of a play event "forehand stroke." When the user who plays tennis hits a ball through the forehand stroke, an oscillatory waveform 4030a generated due to an impact on the ball and a motion waveform 4030b generated by the swing of the racket are acquired through the motion data acquiring section 403. The pattern detecting section 405 decides analysis intervals, for example, based on the oscillatory waveform 4030a, and detects a pattern 4050a by comparing the motion waveform 4030b with a motion pattern 4070 at the analysis intervals. Here, the pattern 4050a is the pattern "swing-1" in the example of FIG. 4. As illustrated in the example of FIG. 4, the pattern "swing-1" is associated with the play event "forehand stroke" in a one-to-one manner. Thus, when the pattern 4050a is detected, the event specifying section 409 can specify a play event 4090a (forehand stroke) with no reference to the state-related information 411.

Meanwhile, FIG. 7 illustrates an example of a play event "1st serve." When the user playing tennis hits a first serve, similarly to the example of FIG. 6, the oscillatory waveform 4030a generated due to the impact of the ball and the motion waveform 4030b generated by the swing of the racket are acquired through the motion data acquiring section 403 (the waveforms are different from those in the example of FIG. 6), and the pattern detecting section 405 detects a pattern 4050b. Here, the pattern 4050b is the pattern "swing-8" in the example of FIG. 4. As illustrated in the example of FIG. 4, the pattern "swing-8" is associated with the two play events "smash" and "serve." Thus, when the pattern 4050b is detected, the event specifying section 409 specifies a play event 4090b with reference to the state-related information 4110. In the illustrated example, the state-related information 4110 indicates the standby state W1 for the 1st serve, and thus the play event 4090b is the play event "1st serve" (in this example, information indicating a first serve is added to the play event "serve" in the example illustrated in FIG. 4).

Figure 8:
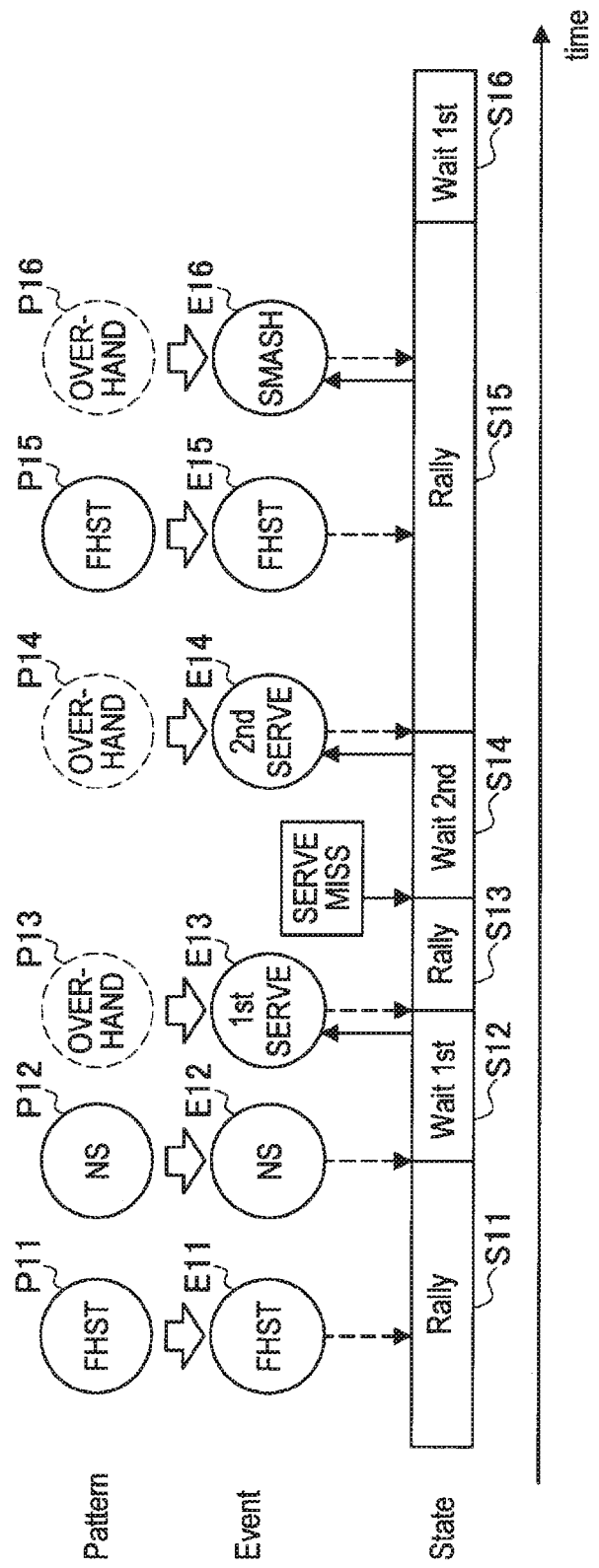
FIG. 8 is a diagram illustrating an example of relations among a pattern of motion data, a play event, and a state according to the first embodiment of the present disclosure.

FIG. 8 is a diagram illustrating an example of relations among a pattern of motion data, a play event, and a state according to the first embodiment of the present disclosure. In an example to be described below, a relation between the pattern of the motion data and the play event is assumed to be defined similarly to the example illustrated in FIG. 4, and a state related to a tennis play is assumed to be defined similarly to the example illustrated in FIG. 5.

Referring to FIG. 8, first, in a state S11 (rally), the pattern detecting section 405 detects a pattern P11 of a forehand stroke (which is the pattern "swing-1" in the example of FIG. 4 but is referred to as a "forehand stroke pattern" in the description of FIG. 8 for the sake of convenience; the same applies to a pattern P15). At this time, the event specifying section 409 can specify a play event E11 of the forehand stroke with no reference to the state-related information 411. The state management section 415 updates the state-related information 411 based on the specified play event E11. Here, since the shot event (E11) occurs in the rally state (S11), the self transition ($T_{RR}$) of the rally state R occurs, and therefore the state S11 does not change.

Then, in the state S11 (rally), the pattern detecting section 405 detects a pattern P12 of a NOT SWING (NS). At this time, the event specifying section 409 can specify a play event E12 of the NS with no reference to the state-related information 411. The state management section 415 updates the state-related information 411 based on the specified play event E12. Here, since the NS event (E12) occurs in the rally state (S11), the transition ($T_{RW1}$) from the rally state R to the standby state W1 for the 1st serve occurs, and the rally state S11 changes to the standby state S12.

Then, in the state S12 (standby for the 1st serve), the pattern detecting section 405 detects a pattern P13 of an overhand shot (which is the pattern "swing-8" in the example of FIG. 4 but is referred to as an "overhand shot pattern" in the example of FIG. 8 for the sake of convenience; the same applies to patterns P14 and P16). At this time, the event specifying section 409 specifies a play event with reference to the state-related information 411. More specifically, the event specifying section 409 specifies a play event E13 of the 1st serve based on the fact that the state S12 corresponding to the pattern P13 before the play occurs is the standby state for the 1st serve.

Further, the state management section 415 updates the state-related information 411 based on the specified play event E13. Here, since the shot event (E13) occurs in the standby state (S12) for the 1st serve, the transition ($T_{W1R}$) from the standby state W1 for the 1st serve to the rally state R occurs, and the standby state S12 changes to a rally state S13.

Thereafter, in the state S13 (rally), for example, the other sensor data acquiring section 417 detects a serve mistake. The state management section 415 that has provided this information causes the transition ($T_{RW2}$) from the rally state R to the standby state W2 for the 2nd serve to occur, and changes the rally state S13 to a standby state S14 for the 2nd serve.

Then, in the state S14 (standby for the 2nd serve), the pattern detecting section 405 detects the overhand shot pattern P14. At this time, similarly to the case of the pattern P13, the event specifying section 409 specifies the play event with reference to the state-related information 411. More specifically, the event specifying section 409 specifies a play event E14 of the 2nd serve based on the fact that the state S14 corresponding to the pattern P14 before the play occurs is the standby state for the 2nd serve.

Further, the state management section 415 updates the state-related information 411 based on the specified play event E14. Here, since the shot event (E14) occurs in the standby state (S14) for the 2nd serve, the transition ($T_{W2R}$) from the standby state W2 for the 2nd serve to the rally state R occurs, and the standby state S14 changes to a rally state S15.

Thereafter, in the state S15 (rally), the pattern detecting section 405 detects the forehand stroke pattern P15, and the event specifying section 409 specifies a play event E15 of the forehand stroke. At this time, the processes of the event specifying section 409 and the state management section 415 are the same as that for the pattern P11, and thus a description thereof is omitted. As a result, the self transition ($T_{RR}$) of the rally state R occurs, and the state S15 does not change when the pattern P15 is detected.

Then, in the state S15 (rally), the pattern detecting section 405 detects the overhand shot pattern P16. At this time, similarly to the case of the patterns P13 and 14, the event specifying section 409 specifies a play event with reference to the state-related information 411. More specifically, the event specifying section 409 specifies a play event E16 of a smash based on the fact that the state S15 corresponding to the pattern P16 before the play occurs is the rally state.

Further, the state management section 415 updates the state-related information 411 based on the specified play event E16. Here, since the shot event (E16) occurs in the rally state (S15), the self transition ($T_{RR}$) of the rally state R occurs, and therefore the state S15 does not change.

Thereafter, in the state S15 (rally), when a state in which the pattern detecting section 405 has not detected the pattern of the motion data and the event specifying section 409 has not specified the play event continues for a predetermined period of time, the state management section 415 detects this state, for example, using the timer, causes the transition ($T_{Rw1}$) from the rally state R to the standby state W1 for the 1st serve to occur, and changes the rally state S15 to a standby state S16 for the 1st serve.

(1-4. Modified Example)

Figure 9:
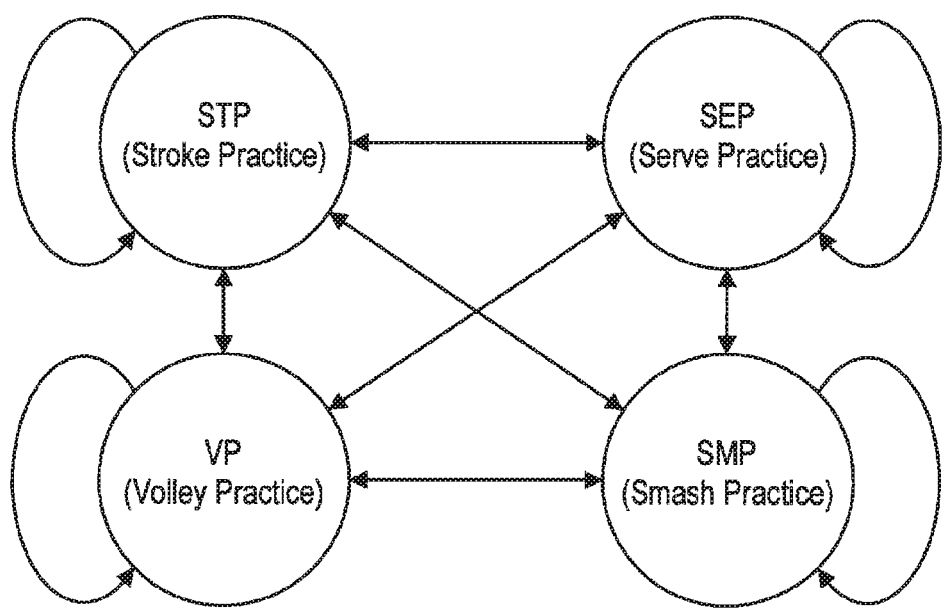
FIG. 9 is a diagram illustrating a modified example of the first embodiment of the present disclosure.

FIG. 9 is a diagram illustrating a modified example of the first embodiment of the present disclosure. FIG. 9 illustrates another example of a state related to a tennis play defined similarly to the example described above with reference to FIG. 5. In the illustrated example, four states of stroke practice (STP), serve practice (SEP), volley practice (VP), and smash practice (SMP) are defined. Similarly to the example illustrated in FIG. 5, transitions between states and self transitions of the respective states are associated with appropriate conditions, and thus it is possible to change the state according to the process of the sports play In the example described above with reference to FIG. 5, the transition of the state is defined according to the rule-based technique in which the transition and the condition are associated, but as another example, for example, a technique of automatically learning a state transition model based on observation data may be employed. The state transition model can be defined as a probability model such as a hidden Markov model (HMM).

The first embodiment of the present disclosure has been described above. In the present embodiment, the context of the sports play of the user is held based on the state-related information 411. The state-related information 411 is updated based on the information provided by the event specifying section 409 and/or the other sensor data acquiring section 417. Thus, the event specifying section 409 can specify the play event based on the pattern of the motion data detected by the pattern detecting section 405 when specify an appropriate play event based on the context of a play with reference to the state-related information 411.

2. Second Embodiment

Next, a second embodiment of the present disclosure will be described. The present embodiment differs from the first embodiment in some components for the analysis process, but the remaining components are the same as those in the first embodiment, and thus a description thereof is omitted.

Figure 10:
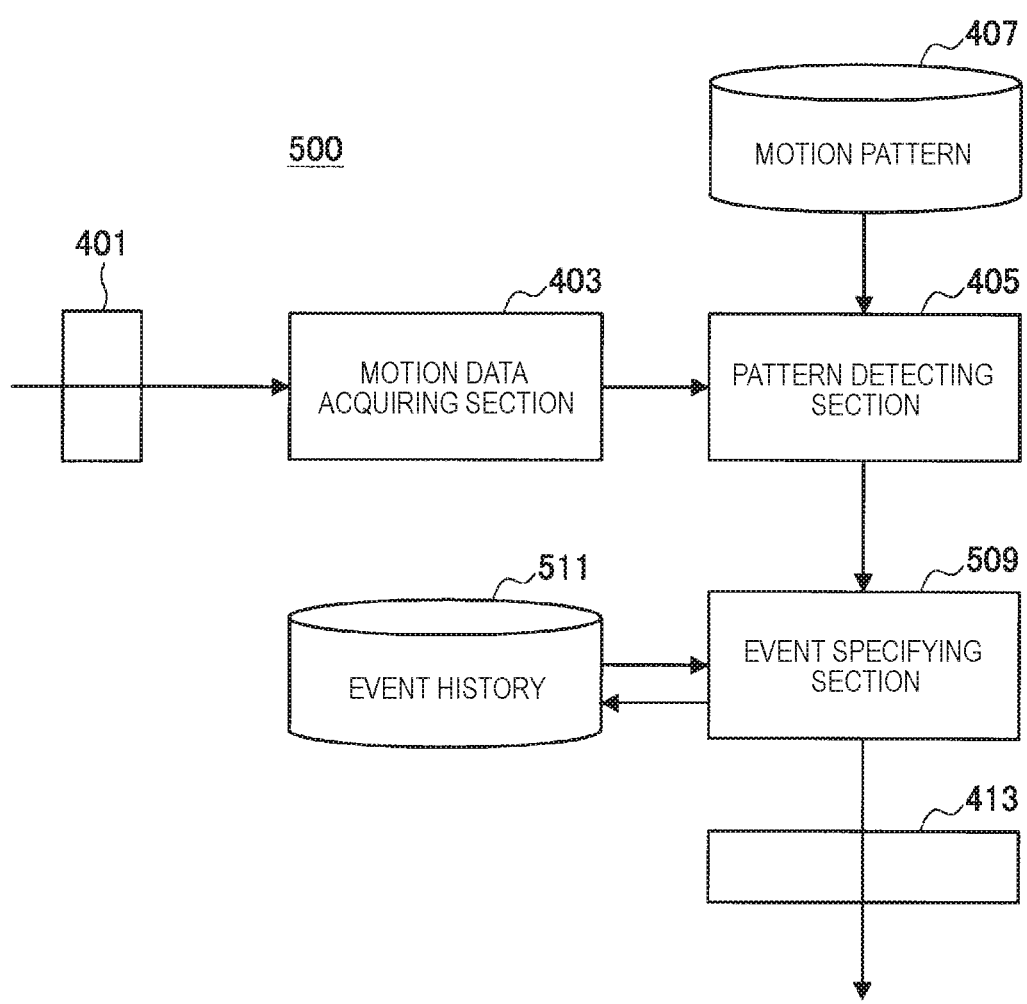
FIG. 10 is a block diagram illustrating a functional configuration for an analysis process according to a second embodiment of the present disclosure.

FIG. 10 is a block diagram illustrating a functional configuration for an analysis process according to the second embodiment of the present disclosure. Referring to FIG. 10, a functional configuration 500 includes an input interface 401, a motion data acquiring section 403, a pattern detecting section 405, an event specifying section 509, and an output interface 413. In the functional configuration 500, the processing sections except the input interface 401 and the output interface 413, that is, the motion data acquiring section 403, the pattern detecting section 405, and the event specifying section 509, are implemented by the processing section 120 of the sensor apparatus 100, the processing section 220 of the smart phone 200, and/or the processing section 320 of the server 300. They are implemented by the processing section 120 of the sensor apparatus 100, the processing section 220 of the smart phone 200, and/or the processing section 320 of the server 300. In the following, the event specifying section 509 that is a different component from that in the first embodiment and an event history 511 that is referred to by the event specifying section 509 will be further described.

The event specifying section 509 specifies a play event corresponding to a play of the user based on the pattern of the motion data detected by the pattern detecting section 405. In the present embodiment, the event specifying section 509 refers to the event history 511 instead of the state-related information 411 that is referred to by the event specifying section 409 in the first embodiment. In the present embodiment, the event history 511 is stored in a storage section of an apparatus that performs the analysis process. Alternatively, the event history 511 may be stored in a storage section of a different apparatus from an apparatus that performs the analysis process, and the event specifying section 509 may refer to the event history 511 via a network. When the play event is specified including the case in which it is unnecessary to refer to the event history 511, the event specifying section 509 adds information of the specified play event to the event history 511.

The event history 511 is information indicating a history of an event specified by the event specifying section 509 and referred to when the event specifying section 509 specifies a play event. In other words, in the present embodiment, the event specifying section 509 specifies a play event corresponding to a pattern of newly detected motion data based on a history of an event that is specified in the past by the event specifying section 509. For example, the information indicating the play event described with reference to FIG. 4 in the first embodiment and a time stamp indicating a time at which each play event occurs are stored in the event history 511.

Figure 11:
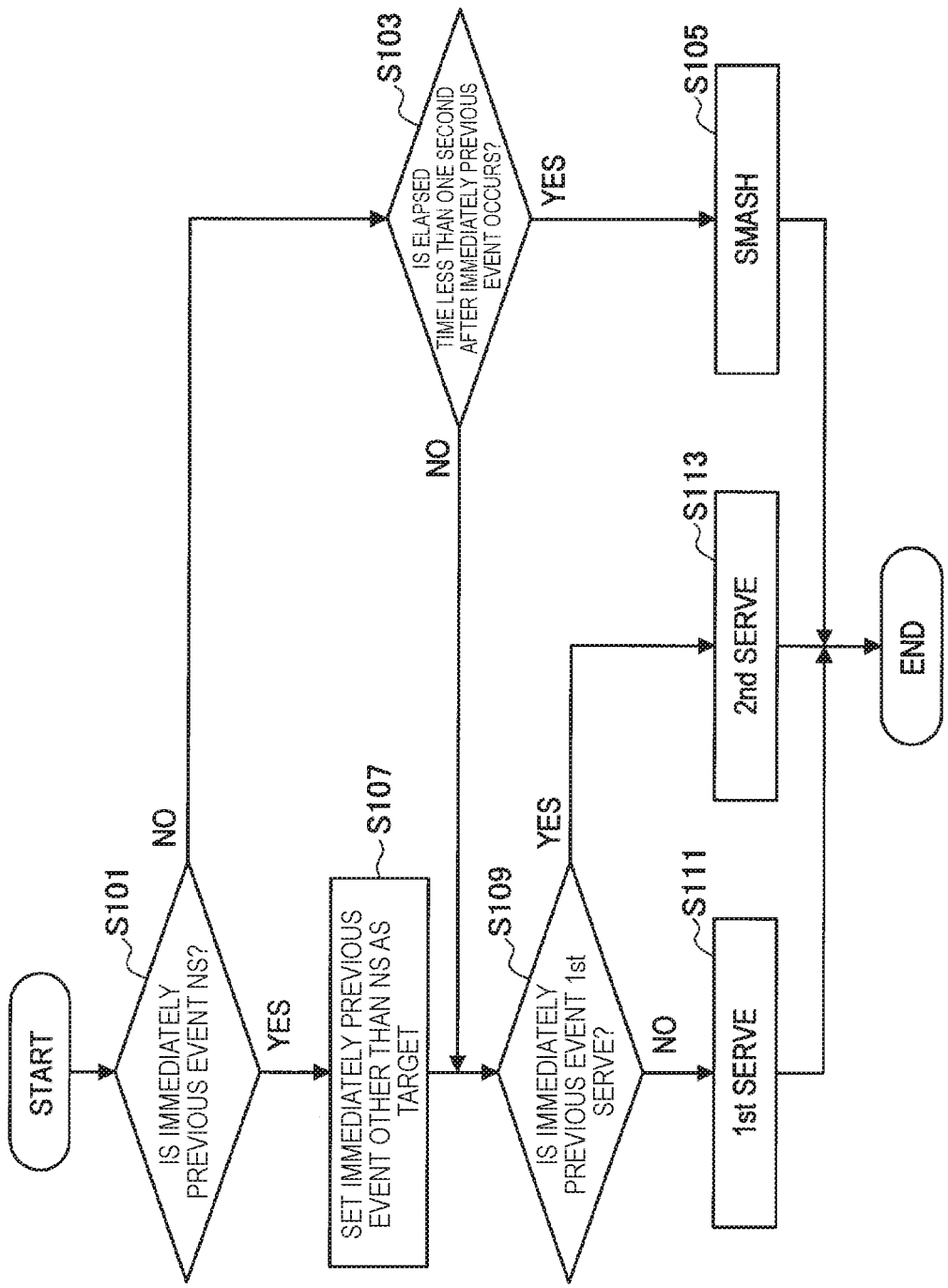
FIG. 11 is a flowchart illustrating an example of a process of specifying a play event with reference to an event history according to the present embodiment.

FIG. 11 is a flowchart illustrating an example of a play event specifying process that is performed with reference to the event history according to the present embodiment. In an example to be described below, a relation between a pattern of motion data and a play event is assumed to be defined similarly to the example illustrated in FIG. 4 in the first embodiment. Thus, when specifying the play event, the event specifying section 509 refers to the event history 511 when the pattern detecting section 405 detects the pattern "swing-8" (the overhand shot).

Referring to FIG. 11, when the pattern detecting section 405 detects the pattern "swing-8" (the overhand shot), the event specifying section 509 determines whether or not an immediately previously specified event is the NS (NOT SWING) with reference to the event history 511 (S101). Here, when the immediately previously specified event is not the NS, that is, when the immediately previously specified event is the shot event (NO), the event specifying section 509 further determines whether or not an elapsed time is less than one second after an immediately previous event (shot event) occurs (S103). Here, one second is an example of a time threshold value corresponding to an interval between shots in a rally, and as another example, a different time threshold value may be employed.

When the elapsed time is determined to be less than one second after a previous event occurs in S103 (YES), the event specifying section 509 specifies the play event "smash" (S105). In this case, the event specifying section 509 identifies the context of the same play as the rally state R described in the first embodiment based on the conditions that "the immediately previous event is not the NS" (determination of S101), and "the elapsed time after the immediately previous event occurs is less than one second" (determination of S103).

On the other hand, when the immediately previously specified event is determined to be the NS in S101 (YES), the event specifying section 509 sets the immediately previous event other than the NS as a determination target related to the event history (S107). When an event serving as the NS are specified continuously twice or more, the event specifying section 509 sets an event other than the NS, that is, a shot event, that is specified before that as the determination target.

When the elapsed time after the immediately previous event occurs is determined not to be less than one second in S103 (NO) or when the immediately previous event other than the NS is set as the determination target in S107, the event specifying section 509 further determines whether or not the immediately previous event is the play event of the 1st serve (S109). Here, when the immediately previous event (which is limited to the shot event as a result of S101 and S107) is not the 1st serve (NO), the event specifying section 509 specifies the play event "1st serve" (S111). In this case, the event specifying section 509 identifies the context of the same play as the standby state W1 for the 1st serve described in the first embodiment based on the conditions that "the immediately previous event is the NS" (determination of S101), and "the immediately previous event other than the NS is not the 1st serve" (determination of S109) or the conditions that "the immediately previous event is the shot event" (determination of S101), "the elapsed time after the immediately previous shot event occurs is more than one second" (determination of S103), and "the immediately previous shot event is not the 1st serve" (determination of S109).

On the other hand, when the immediately previous event is determined to be the 1st serve in S109 (YES), the event specifying section 509 specifies the play event "2nd serve" (S113). In this case, the event specifying section 509 identifies the context of the same play as the standby state W2 for the 2nd serve described in the first embodiment based on the conditions that "the immediately previous event is the NS" (determination of S101), and "the immediately previous event other than the NS is the 1st serve" (determination of S109) or the conditions that "the immediately previous event is the shot event" (determination of S101), "the elapsed time after the immediately previous shot event occurs is more than one second" (determination of S103), and "the immediately previous shot event is the 1st serve" (determination of S109).

Strictly, even if the immediately previous shot event is the 1st serve, in the case of a service ace or a service winner, an event that occurs next may be the 1st serve. Thus, more accurately, the determination of S109 may be determination as to whether or not "the immediately previous event is the play event of the 1st serve, and the serve mistake has been detected." For example, the serve mistake may be detected based on the information that is acquired by the other sensor data acquiring section 417, or the information that is manually input by the user, or the like as described above in the first embodiment.

The second embodiment of the present disclosure has been described above. In the present embodiment, the context of the sports play of the user is identified based on the information stored in the event history 511. In other words, in the present embodiment, instead of holding information directly indicating the context of a play, the event history 511 serving as the information serving as a source identifying the context is held, and the context of a play is identified based on the event history 511 when a pattern of motion data that needs to be determined based on the context is detected. In the present embodiment, similarly to the first embodiment, the state management section 415 need not perform the process of updating the state-related information 411, and thus a processing load can be reduced.

3. Hardware Configurations

Next, examples of hardware configurations for implementing the sensor apparatus and the information processing apparatus (in the above described examples, the sensor apparatus, the smart phone or the server) according to an embodiment of the present disclosure will be described with reference to FIG. 12 and FIG. 13.

(Sensor Apparatus)

Figure 12:
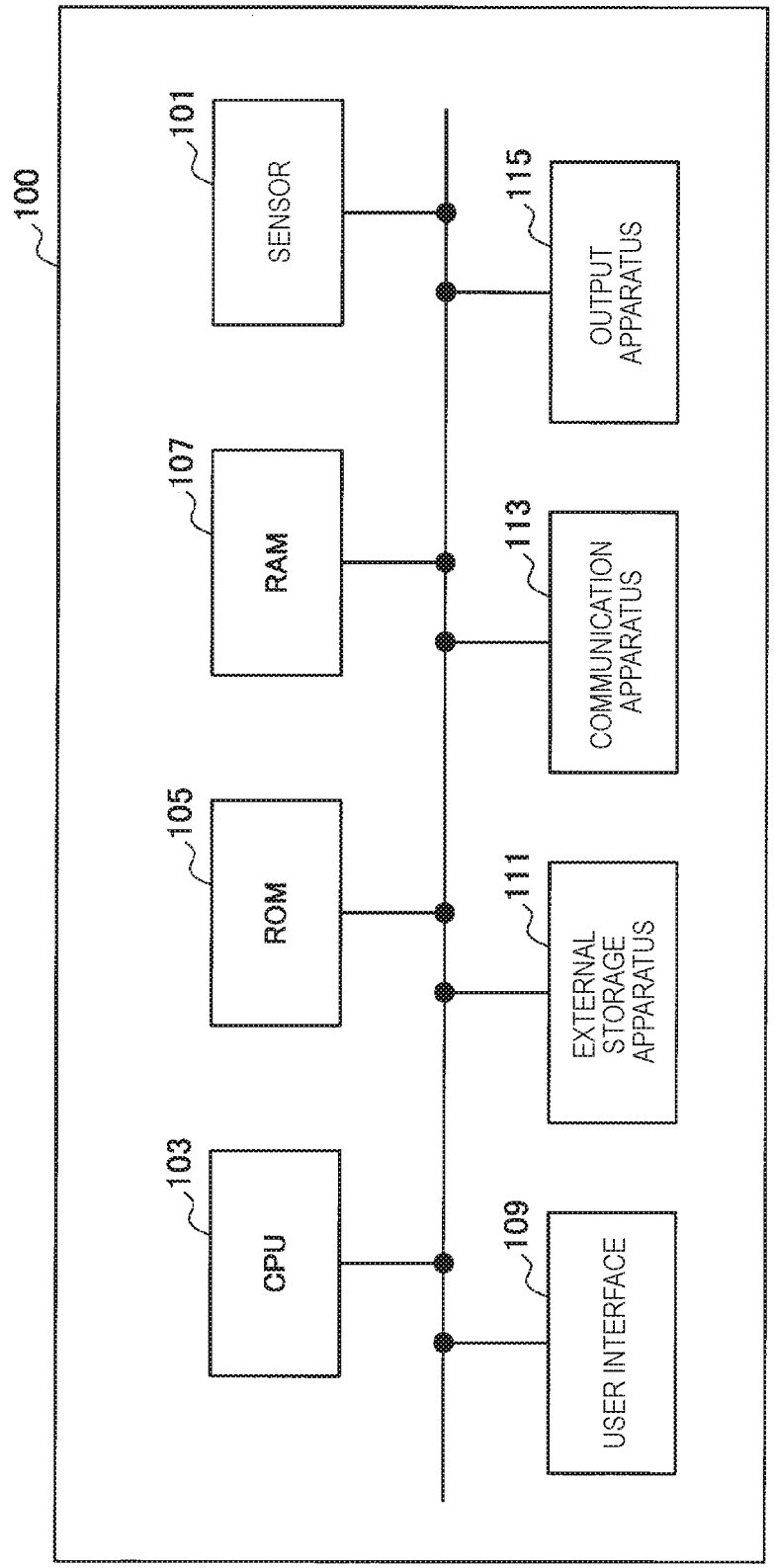
FIG. 12 is a diagram illustrating an example of a hardware configuration of a sensor apparatus according to an embodiment of the present disclosure.

FIG. 12 is a diagram illustrating an example of a hardware configuration of the sensor apparatus according to an embodiment of the present disclosure. With reference to FIG. 12, the sensor apparatus 100 may include a sensor 101, a Central Processing Unit (CPU) 103, a Read Only Memory (ROM) 105, a Random Access Memory (RAM) 107, a user interface 109, an external storage apparatus 111, a communication apparatus 113, and an output apparatus 115. These elements are mutually connected by a bus, for example.

For example, the sensor 101 includes an acceleration sensor, an angular velocity sensor, a vibration sensor, a magnetic field sensor, a temperature sensor, a pressure sensor (including a press switch), a Global Positioning System (GPS) receiver or the like. The sensor 101 may include a camera (imaging sensor) or a microphone (audio sensor).

The CPU 103, the ROM 105 and the RAM 107 implement various types of functions with software, by reading and executing program instructions, for example, recorded in the external storage apparatus 111. In the embodiments of the present disclosure, functions such as control of the entire sensor apparatus 100 may be implemented, for example, by the CPU 103, the ROM 105 and the RAM 107.

The user interface 109 is, for example, an input apparatus such as buttons or a touch panel, which receives user operations of the sensor apparatus 100. For example, operations of a user may instruct the start or completion of the transmission of sensor information from the sensor apparatus.

The external storage apparatus 111 stores various types of information related to the sensor apparatus 100. For example, program instructions for causing functions to be implemented by software in the CPU 103, the ROM 105 and RAM 107 may be stored in the external storage apparatus 111, or data acquired by the sensor 101 may be cached temporarily. When considering that the sensor apparatus 100 is mounted in a hitting tool or the like, it is desirable to use a sensor apparatus, for example, with a strong impact such as a semiconductor memory, as the external storage apparatus 111.

Further, a configuration corresponding to an internal storage region (a memory or an external storage device) that accumulates data detected in the sensor apparatus 100 when the smart phone 200 is not arranged near the user who is playing a sport is the ROM 105, the RAM 107, and/or the external storage apparatus 111, The communication apparatus 113 communicates with the information processing apparatus 600, which will be described later, by various types of wired or wireless communication systems. Further, the communication apparatus 113 may directly communicate with the information processing apparatus 600 by inter-device communication, or may communicate with the information processing apparatus 600 via a network such as the internet.

The output apparatus 115 is constituted by an apparatus capable of outputting information as light, audio or images. For example, the output apparatus 115 may output information which notifies detection of a time or play event in the sensor apparatus 100, or may output a visual or aural notification to a user, based on an analysis result received from the information processing apparatus 600 or an analysis result calculated in the sensor apparatus 100. For example, the output apparatus 115 includes, for example, a display such as a lamp of an LED or the like or an LCD, a speaker, a vibrator or the like.

(Information Processing Apparatus)

FIG. 13 is a diagram illustrating an example of a hardware configuration of the information processing apparatus according to an embodiment of the present disclosure. The information processing apparatus 600 may implement, for example, the information processing apparatus according to an embodiment of the present disclosure, or the smart phone 200 or the server 300 described above. Note that, as described above, the information processing apparatus may be implemented by the sensor apparatus 100.

The information processing apparatus 600 may include a CPU 601, a ROM 603, a RAM 605, a user interface 609, an external storage apparatus 611, a communication apparatus 613, and an output apparatus 615. These elements are mutually connected by a bus, for example.

The CPU 601, the ROM 603 and the RAM 605 implement various types of functions with software, by reading and executing program instructions, for example, recorded in the external storage apparatus 611. In the embodiments of the present disclosure, control of the entire information processing apparatus 600, functions of the processing section in the above described functional configuration or the like, may be implemented, for example, by the CPU 601, the ROM 603 and the RAM 605.

The user interface 609 is, for example, an input apparatus such as buttons or a touch panel, which receives user operations of the information processing, apparatus 600.

The external storage apparatus 611 stores various types of information related to the information processing apparatus 600. For example, program instructions for causing functions to be implemented by software in the CPU 601, the ROM 603 and RAM 605 may be stored in the external storage apparatus 611, or sensor information received by the communication apparatus 613 may be cached temporarily. Further, a log of analysis results may be accumulated in the external storage apparatus 611.

The output apparatus 615 is constituted by an apparatus capable of visually or aurally notifying information to a user. For example, the output apparatus 615 may be a display device such as a Liquid Crystal Display (LCD), or an audio output device such as a speaker or headphones. The output apparatus 615 outputs a result obtained by the processes of the information processing apparatus 600 as video images such as text or pictures, or outputs the results as audio such as voices or sounds.

Heretofore, examples of the hardware configurations of the sensor apparatus 100 and the information processing apparatus 600 have been shown. Each of the above described constituent elements may be constituted by using generic members, or may be constituted by hardware specialized for the functions of each of the constituent elements. Such a configuration may be appropriately changed in accordance with the technology level at the time of implementation.

4. Supplement

For example, the embodiments of the present disclosure may include an information processing apparatus such as that described above (an information processing terminal such as a smart phone, a server, or a sensor apparatus), a system, an information processing method executed by the information processing apparatus or the system, a program for causing the information processing apparatus to function, and a non-temporarily tangible medium on which programs are recorded.

More specifically, for example, an embodiment of the present disclosure includes an information processing apparatus that includes a data acquiring section configured to acquire sensing data generated due to an action of a target and an event specifying section configured to specify an event corresponding to the action based on a pattern shown in the sensing data and a context of the action.

For example, in the first and second embodiments, the sports play of the user is described as the action of the target. However, as another embodiment, the target is not limited to the user (may be an animal or an object rather than a person), and the action is not limited to the sports play and may be any action. For example, when the user who is driving a vehicle puts his/her head down, it is useful to identify whether the user is bowing or falling asleep based on the context (for example, a driving state) of the action. For example, when the user is bowing, identifying whether he/she is bowing in greeting or bowing in apology based on the context (for example, a conversation tone or the like) of an action is useful in a service of sharing a behavior status of the user or the like. Further, even when the action is a sports play, a type of sport is not limited to tennis, and the sport may be, for example, volleyball (a jump serve and a spike (attack) are identified based on the context), table tennis (a forehand or backhand swing or drive and each shot that is hit as a serve are identified based on the context), or the like. The sports to which the present technology is applicable are not limited to the match-type ball sports described above and may be any types of sports in which the context of a play can be defined.

In the first and second embodiments, the motion data is described as the sensing data. However, as another embodiment, the sensing data is not limited to the motion data and may be an imaging apparatus that acquires an image of the action of the target, a biometric information sensor that measures a pulse of a person or an animal serving as the target or the like, or the like. The sensing data may be provided by a sensor for acquiring information on an environment of a target such as a temperature sensor, a humidity sensor, an illuminance sensor, a position sensor (a GPS receiver), or the like.

In the first and second embodiments, the event is specified based on the context before the action (play) occurs. However, as another embodiment, the event is specified further based on the context after the action (play) occurs. For example, when the event is specified in real time while the action (play) is being performed, the event is specified based on the context before the action (play) occurs, but when the event is specified ex post facto after the action (play) occurs, it is possible to specify the event corresponding to the action further based on the context after the action (play) occurs.

In the first and second embodiments, the context is referred to when it is difficult to specify the play event based on only the pattern of the sensing data (the motion data). However, as another embodiment, the determination based on the context may be higher in priority than the determination based on the pattern. For example, in the example of tennis as in the first and second embodiments, when the context corresponding to the standby state for a serve is indicated by the state-related information 411 or the event history 511, the play event of the serve may be specified when a shot occurs regardless of the pattern of the motion data. For example, when the serves of tennis include an overhead serve and an under serve, and in the case of the under serve, the pattern of the motion data different from that of the overhead serve (similar to the smash) is generated. As described above, using the determination based on the context, it is possible to detect the play event of the serve properly in any case.

A certain player may hit a serve with an anomalous form deviating from the two patterns. For example, even when a pattern of an anomalous serve is similar to the forehand stroke pattern or not similar to a pattern of any other shot, it is possible to detect the play event of the serve properly using the determination based on the context. As another example, a shot of returning a serve of a partner may be distinguished from other shots as a play event of "return." In this case, the play event of "return" may be specified based on the context (a shot immediately after a serve of a partner) regardless of a type of shot (a forehand stroke, a backhand stroke, or the like) indicated by the pattern of the motion data.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below (1)
An information processing apparatus, including:
a data acquiring section configured to acquire sensing data generated due to an action of a target: and
an event specifying section configured to specify an event corresponding to the action based on a pattern shown in the sensing data and a context of the action.

(2)
The information processing apparatus according to (1), wherein the event specifying section selects the event corresponding to the action from a plurality of events associated with the pattern based on the context.

(3)
The information processing apparatus according to (1) or (2),
wherein the action includes a sports play, and
wherein the event includes at least a play event specified by a rule of the sport.

(4)
The information processing apparatus according to any one of (1) to (3),
wherein the sensing data includes motion data.

(5)
The information processing apparatus according to any one of (1) to (4),
wherein the event specifying section specifies the event corresponding to the action based on the context before the action occurs.

(6)
The information processing apparatus according to (5),
wherein the event specifying section specifies the event corresponding to the action further based on the context after the action occurs.

(7)
The information processing apparatus according to any one of (1) to (6),
wherein the context is defined based on at least the sensing data.

(8)
The information processing apparatus according to (7),
wherein the event specifying section specifies the event corresponding to the action based on an event history before the action occurs.

(9)
The information processing apparatus according to any one of (1) to (8),
wherein the context is defined based on data different from the sensing data.

(10)
The information processing apparatus according to (9),
wherein the sensing data includes motion data, and
wherein the context is defined based on a different type of sensing data from the motion data.

(11)
A recording medium having a program recorded thereon, the program causing a processor of an information processing apparatus to implement:
a data acquisition function of acquiring sensing data generated due to an action of a target; and
an event specifying function of specifying an event corresponding to the action based on a pattern shown in the sensing data and a context of the action.

(12)
An information processing method, including:
sensing an action of a target;
transmitting sensing data acquired by the sensing; and
performing, by a processor of an information processing apparatus that receives the sensing data, a process of specifying an event corresponding to the action based on a pattern shown in the sensing data and a context of the action,

REFERENCE SIGNS LIST 10 system
100 sensor apparatus
110 sensor
120 processing section
200 smart phone
210 reception section
220 processing section
300 server
310 reception section
320 processing section
403 motion data acquiring section
405 pattern detecting section
407 motion pattern
409, 509 event specifying section
411 state-related information
415 state management section
417 other sensor data acquiring section
511 event history

The invention claimed is:

1. An information processing apparatus, comprising:
a data acquiring section configured to acquire sensing data generated due to an action of a target;
a pattern detecting section configured to detect a pattern shown in the sensing data; and
an event specifying section configured to identify at least two events, of a plurality of events, associated with the detected pattern shown in the sensing data, wherein the event specifying section specifies, based on a context of the action, an event corresponding to the action by selecting, from among the at least two events associated with the detected pattern, only one event of the at least two events as the event corresponding to the action, wherein, in a case the detected pattern is not associated with an event that corresponds with the context, the event specifying section specifies an event corresponding to the action based on the context regardless of the detected pattern, wherein the context is identified based on at least one event of a history of events before the event corresponding to the action, wherein the event is specified by a rule related to the action, and wherein the data acquiring section, the pattern detecting section, and the event specifying section are each implemented via at least one processor.

2. The information processing apparatus according to claim 1,
wherein the action includes a sports play, and
wherein the event includes at least a play event specified by the rule.

3. The information processing apparatus according to claim 1,
wherein the sensing data includes motion data.

4. The information processing apparatus according to claim 1,
wherein the event specifying section specifies the event corresponding to the action based on the context before the action occurs.

5. The information processing apparatus according to claim 4,
wherein the event specifying section specifies the event corresponding to the action further based on the context after the action occurs.

6. The information processing apparatus according to claim 1,
wherein the context is defined based on at least the sensing data.

7. The information processing apparatus according to claim 1,
wherein the context is defined based on data different from the sensing data.

8. The information processing apparatus according to claim 7,
wherein the sensing data includes motion data, and
wherein the context is defined based on a different type of sensing data from the motion data.

9. The information processing apparatus according to claim 1,
wherein the context of the action is state-related information of the target.

10. The information processing apparatus according to claim 9,
wherein the state-related information includes information indicating a state of a sports play of the target.

11. The information processing apparatus according to claim 1, further comprising:

a management section configured to update the context of the action based on the event corresponding to the action,
wherein the management section is implemented via at least one processor.

12. The information processing apparatus according to claim 1,
wherein the context is further identified based on whether or not an elapsed time after the at least one event of the history of events occurs is less than a predetermined amount of time.

13. A non-transitory computer-readable recording medium having embodied thereon a program, which when executed by a computer causes the computer to execute a method, the method comprising:

acquiring sensing data generated due to an action of a target;
detecting a pattern shown in the sensing data;
identifying at least two events, of a plurality of events, associated with the detected pattern shown in the sensing data;
specifying, based on a context of the action, an event corresponding to the action by selecting, from among the at least two events associated with the pattern, only one event of the at least two events as the event corresponding to the action; and
specifying, in a case the detected pattern is not associated with an event that corresponds with the context, an event corresponding to the action based on the context regardless of the detected pattern,
wherein the context is identified based on at least one event of a history of events before the event corresponding to the action, and
wherein the event is specified by a rule related to the action.

14. An information processing method, comprising:
sensing an action of a target;
transmitting sensing data acquired by the sensing; and
performing, by a processor of an information processing apparatus that receives the sensing data, a process of detecting a pattern shown in the sensing data, identifying at least two events, of a plurality of events, associated with the detected pattern shown in the sensing data, specifying, based on a context of the action, an event corresponding to the action by selecting, from among the at least two events associated with the pattern, only one event of the at least two events as the event corresponding to the action, and specifying, in a case the detected pattern is not associated with an event that corresponds with the context, an event corresponding to the action based on the context regardless of the detected pattern,
wherein the context is identified based on at least one event of a history of events before the event corresponding to the action, and
wherein the event is specified by a rule related to the action.

* * * * *